3,176,007
PROCESS EMPLOYING CHELATING AGENTS TO PREPARE SLUDGE - FREE HYDROXYALKYL STARCH ETHERS
John V. Tuschhoff, Decatur, Ill., assignor to A. E. Staley Manufacturing Company, Decatur, Ill., a corporation of Delaware
No Drawing. Filed June 15, 1961, Ser. No. 117,277
6 Claims. (Cl. 260—233.3)

This invention relates to an improved method of making hydroxyalkyl ethers of starch. More specifically, this invention relates to an improved method of preparing hydroxylkyl ethers of starch in the presence of a compound that forms a stable chelate with iron over the pH range of 7 to 9, especially a water-soluble salt of ethylenediaminetetraacetic acid.

Hydroxyalkyl ethers of starch are prepared by reacting starch with an alkylene oxide, as taught by Kesler et al. in United States Patent 2,516,633. This process comprises reacting starch and an alkylene oxide under alkaline conditions, followed by neutralization of the alkaline catalyst to a pH of from about 5 to 7. Before this invention, an undesirable black colloidal material was often formed during the neutralization of the reaction mixture, and it was difficult, if not impossible to separate it from the starch ether. An analysis of this black colloidal material indicated that it was a mixture or complex of iron with an organic material. Apparently, not all of the iron precipitated in the black colloidal material formed on neutralization, for, at times, a similar dark sludge appeared later when the hydroxyalkyl starch was pasted prior to use. At other times, the black colloidal material did not appear when the reaction mixture was neutralized, but when the starch ether was pasted prior to use, a similar unfilterable dark sludge appeared that deposited on the products made with the starch (e.g., paper, textiles, etc.). For reasons that will be explained later, sludge or colloidal material seems to be produced, in part, by the reaction of the epoxy compound with iron contaminants which are in the reactants and/or are the result of corrosion. Acid-treated starches have a particularly high content of iron and this problem is accentuated with them. An object of this invention is to provide a method of preparing hydroxyalkyl starch ethers whereby to suppress the formation of dark colloidal material upon neutralization of the reaction mixture and the formation and precipitation of dark sludge when the product is pasted.

Another object of this invention is to increase the efficiency of the alkaline-catalyzed hydroxyalkylation of starch.

I have found that I can prevent the formation of dark colloidal material during the hydroxyalkylation and neutralization of starch reaction products by carrying out the alkaline reaction with the alkylene oxide in the presence of a chelating compound which forms a stable chelate with iron over the pH range of 7 to 9. The presence of the aforementioned class of chelating materials in a proportion of only 0.01 to 5% by weight of the dry starch prevents the formation of black colloidal material and minimizes the amount of dark sludge in the pasted product. The upper limit in the proportions of the chelating agents is dictated by the economics of the process. The lower limits are dependent upon the concentration of iron in the reaction area.

While any water-soluble compound can be used if, in a small but effective concentration, it forms a stable chelate with iron over the pH range of 7 to 9, the preferred chelating agents are those based on ethylenediaminepolyacetic acid and its water-soluble salts, such as the alkali metal salts of ethylenediaminetetraacetic acid, the sodium salt of ethylenediamine-di-(orthohydroxyphenyl)-diacetic acid, the sodium salt of ethylenediaminedi-(hydroxyethyl)-diacetic acid, etc. The sodium salts of ethylenediaminetetraacetic acid are particularly preferred since they are readily available and form a stable complex with iron over the pH range of 6 to 9 when used economically in a concentration of from 0.025% to 0.1% by weight of the dry starch. I have found that the commercially available sodium gluconates, which chelate iron at a pH above 9, and sequestrants such as Calgon are of little benefit. Apparently, the iron impurity must be chelated during the neutralization step, i.e., while the pH is being reduced, since the starch itself participates to some extent in the formation of the iron-bearing material. Once the reaction mixture is at an acid pH, the iron has little tendency to complex deleteriously with the starch ether product or with excess alkylene oxide or with polyalkyleneoxide formed during the hydroxyalkylation.

Surprisingly, I have discovered, not only does the chelating agent suppress the formation of black colloidal material during or after the reaction, but, under the conditions of this invention, the chelating agent seems to serve as a secondary catalyst increasing the efficiency of the utilization of alkylene oxide by 10 to 30% and normally about 20%. From this increased efficiency, it appears that the black colloidal material is at least partly the reaction product of the epoxy compound.

The starch used in this invention may be any native starch, a modified starch, or a derivative of starch having etherifiable hydroxyl groups. Corn starch, tapioca starch, rice starch, waxy corn starch, potato starch, wheat starch, and the amylose and amylopectin fractions therefrom are representative of the various native starch varieties and starch fractions that may be used in this invention. Any of these starch varieties may be modified, as by enzyme treatment, by oxidation with hypochlorite, or by treatment with an acid. Starch derivatives, such as starch acetates, carboxymethyl starch, carboxyethyl starch, methyl starch, etc., can also be used.

The alkylene oxides used in this invention are characterized as vicinal epoxy compounds wherein the epoxy oxygen is attached to adjacent carbon atoms. Included among these compounds are ethylene oxide, 1,2-propylene oxide, 1,2-butylene oxide, 2,3-butylene oxide, styrene oxide, epichlorohydrin, 3 - diethylamino - 1,2-epoxypropane, etc. These compounds can be used in a concentration of from about 0.1% to 10% by weight of the dry starch. However, when ethylene oxide is reacted with granular starch in aqueous suspension and a granular product is desired, the ethylene oxide should not be used in a concentration above 5% by weight of the dry starch.

The alkaline catalyst for this reaction may be any water-soluble alkaline material. The catalyst may be an alkali metal hydroxide, such as sodium hydroxide and potassium hydroxide; an akali metal salt of a weak acid, such as sodium carbonate; a quaternary alkyl ammonium hydroxide, such as tetramethyl ammonium hydroxide; an alkaline brine, such as an aqueous solution of sodium chloride and sodium hydroxide; etc.

In somewhat greater detail, granular starch is suspended in an aqueous medium in which the starch comprises from about 2 to 60% by weight of the composition and then an alkaline catalyst is added to adjust the pH to the desired level between about 9 to 12. The chelating agent can be added before or after the addition of the alkaline catalyst. Alternatively, the granular starch may be suspended in an aqueous alkaline medium. In either case, the starch can be pasted, if desired, prior to, during or after reaction with the epoxy compound. In those cases where the starch is pasted, it can be used in that form, concentrated partially on hot rolls, or recovered as a dried paste by conventional starch-paste-drying methods, such as spray drying or heating on hot rolls. However, I prefer to carry out this reaction on a granular starch suspension under non-gelatinizing conditions as set forth in Kesler et al. Patent 2,516,633 in order to recover a granular product, since the granular product is more easily separated from the reaction mixture. Further, the pasted product cannot be freed of salts, excess catalyst and, particularly, chelated iron unless organic solvents are used.

The hydroxyalkylation reaction is preferably carried out at from about 90° F. to 130° F. Useful, but slower reaction rates are obtained at temperatures as low as 35° F. to 40° F. Higher temperatures increase the rate of reaction, and the temperature is limited only by the pasting temperature of the starch derivative where it is desired to preserve the granular form. The hydroxyalkylation is advantageously carried out in a closed vessel when volatile epoxides are employed, such as ethylene oxide and propylene oxide.

The catalyst is neutralized to a pH of from about 5 to 7 at the termination of the hydroxyalkylation reaction. It is at this point in the process, as the pH of the reaction mixture passes from about 9 to 7, that black colloidal material appears in the absence of the aforementioned chelating agents. Little dark sludge or colloidal black material forms when the starch is at an acid pH initially. When a granular product is recovered, a substantial percentage of the water-soluble iron (chelated iron) is separated from the starch by washing. The remainder of the iron, which remains with the starch, is evidently present in a chelated form which is not free to precipitate. This is indicated by the fact that the starch filter cake does not give a test for iron (a pinkish red color) when treated with KSCN, a well-known specific spot test reagent for iron, and by the pure white color of the starch ether. On the other hand, the water-insoluble black colloidal material, which forms during the neutralization of hydroxyalkyl starch ethers that have been prepared in the absence of the aforesaid iron chelating agents, cannot be washed out of the starch and the iron starch filter cake gives a positive test for iron when treated with KSCN.

Dry blending an acid buffer (to yield a slightly acid paste) in a concentration of from about 0.01% to 1% by weight of the dry starch with the granular hydroxyalkyl starch ethers of this invention confers additional color stability to the starch even after it has been circulated at elevated temperature for a prolonged period in the pasted form. As stated previously, neither the sludge nor the black colloidal material has much of a tendency to form at an acid pH. However, this acidity of the environment (pH 5 to 7) is not sufficient to dissolve the black colloidal material once it has been formed. Monosodium phosphate is a preferred buffer because of its secondary sequestering properties.

The products formed by the process of this invention have a higher weight percent of hydroxyalkyl groups, reduced iron content, improved paste color and reduced ferriferous colloidal material (which does not precipitate) as contrasted to products made under the same conditions in the absence of the aforesaid chelating agents.

In the examples that follow reference is made to the number of ml. of dark sludge in a 50 gram sample of starch. This determination was carried out by pasting 50 grams of the granular hydroxyalkyl starch in 800 ml. of water at 205° F. and then allowing it to stand without stirring at 205° F. for 24 hours. The starch paste was decanted; the settled material on the bottom of the beaker was washed into a ml. centrifuge tube, centrifuged, and the volume of the settled material read.

The following examples are merely illustrative and should not be construed as limiting the scope of the invention. Concentrations are in parts by weight.

EXAMPLE I

A suspension of 610 parts (dry solids basis) of an acid-converted corn starch in 690 parts tap water was placed into a steel vessel, equipped with thermometer, stirrer and gas inlet tube extending beneath the surface of the suspension. Three-hundredths part of the sodium salt of ethylene-diaminetetraacetic acid and an aqueous brine containing 30.0 parts of sodium chloride and 7 parts of sodium hydroxide in 100 parts water were added to the vessel, which was then sealed. Thirteen and four-tenths parts of ethylene oxide was bubbled through the inlet tube and then the inlet tube was sealed off. The reaction mixture was stirred for 12 hours while the reaction temperature was maintained at 110° F. The starch sample was then neutralized to pH 6.5 using muriatic acid, filtered and the solid was washed with water. The granular starch ether product was white and had no visible scum or sludge. The product was analyzed for iron and for hydroxyethyl substitution. The volume of sludge was determined as described. A 500 gram filter cake gave a negative test for iron when treated with KSCN.

EXAMPLE II

A second sample was prepared immediately thereafter by the same method using the same equipment, except that the ethylenediaminetetraacetic acid salt was omitted. A black scum formed on neutralization of the reactants, which was not removed from the recovered solid by washing with water. The volume of scum was determined as described before. A 500 gram filter cake gave a positive pinkish red test for iron when treated with KSCN.

EXAMPLES III THRU VI

Example I was repeated twice more (Examples III and V) and Example II was repeated twice more (Examples IV and VI). In those cases where the ethylenediaminetetraacetic acid salt was employed the product had no visible scum, while in Examples IV and VI the products had a visible, black scum.

*Table I*

| Example | Volume of Sludge in 50 g. sample ml. | Iron content in parts per million of dry product | Hydroxyethyl content of final product |
|---|---|---|---|
| I | 2.0 | 5.7 | 1.90 |
| III | 2.5 | 7.0 | 2.00 |
| V | 3.0 | 5.5 | 1.85 |
| Average | 2.5 | 6.1 | 1.92 |
| II | 6.0 | 10.7 | 1.67 |
| IV | 20.0 | 9.4 | 1.40 |
| VI | 2.5 | 9.5 | 1.50 |
| Average | 9.5 | 9.9 | 1.52 |

The data in Table I indicate that the samples prepared in the presence of a chelating compound which forms a stable chelate with iron at a pH of from 7 to 9 have substantially less sludge (and no visible black colloidal material in the unpasted product), less iron and a higher level of hydroxyalkylation than equivalent samples prepared in the absence of said chelating compounds. The data also show that the average of Examples I, III and V has 87% of the theoretical number of hydroxyalkyl groups while the average of Examples II, IV and VI has only 69% of the theoretical number of hydroxyalkyl groups, i.e., the efficiency of utilization of the ethylene oxide was increased by more than 25%.

EXAMPLES VII THRU XII

Six samples were prepared by the method of Example I except that the concentration of the sodium salt of ethylenediaminetetraacetic acid was varied as set forth in Table II below.

Table II

| Example | Weight percent of Ethylene-diamine Tetraacetic acid salt | Volume of Sludge, 50 g. sample, ml. | Iron content in parts per million of final product | Hydroxyethyl content of final product |
|---|---|---|---|---|
| VII | 0 | 7.5 | 12.6 | 1.57 |
| VIII | 0 | 15.6 | 9.5 | 1.34 |
| Average of VII+VIII | 0 | 11.5 | 11.0 | 1.46 |
| IX | 0.05 | 2.5 | 6.5 | 1.90 |
| X | 0.05 | 2.0 | 4.5 | 1.70 |
| Average of IX and X | 0.05 | 2.3 | 5.5 | 1.80 |
| XI | 0.10 | 1.5 | 7.2 | 2.00 |
| XII | 0.10 | 2.0 | 5.5 | 1.75 |
| Average of XI and XII | 0.10 | 1.8 | 6.4 | 1.87 |

The data in Table II indicate that the samples prepared in the presence of a chelating compound which forms a stable chelate with iron at a pH of from 7 to 9 have substantially less sludge (and no visible black colloidal material in the unpasted product), less iron and a higher level of hydroxyalkylation than equivalent samples prepared in the absence of said chelating compounds. Little difference is shown by samples prepared in the presence of 0.05% chelating agent and 0.10% chelating agent. The data also show that an average of Examples IX thru XII, prepared in the presence of the sodium salt of ethylenediaminetetraacetic acid, have 83% of the theoretical number of hydroxyalkyl groups. In contrast, Examples VII and VIII prepared in the absence of an effective iron chelating agent have only 66% of the theoretical number of hydroxyalkyl groups.

EXAMPLE XIII

Example I was repeated using 0.025 weight percent of the sodium salt of ethylenediaminetetraacetic acid. The sample had no visible black colloidal material present.

EXAMPLE XIV

A sample having no black colloidal material is prepared by the method of Example I using 5 weight percent of the sodium salt of ethylenediaminetetraacetic acid.

EXAMPLE XV

A sample, which formed a stable paste, was prepared by the method of Example I except that 0.15 weight percent monosodium phosphate was dry blended into the hydroxyalkyl starch ether. A fifty gram sample of starch which had been pasted at 205° F. and maintained at this temperature for several days showed no evidence of black colloidal material.

Since many embodiments of this invention may be made and since many changes may be made in the embodiments described, the foregoing is to be interpreted as illustrative only and my invention is defined by the claims appended hereafter.

I claim:
1. In the process of preparing hydroxalkyl starch ether, which comprises reacting starch with a vicinal epoxy compound in the presence of a water-soluble alkaline catalyst, the improvement which comprises reacting said starch with the vicinal epoxy compound at an alkaline pH in the presence of a small but effective concentration of up to 5% by weight of a water-soluble chelating compound which forms a stable chelate with iron over the pH range of 7 to 9, and then neutralizing the reactants.
2. In the process of preparing granular hydroxyalkyl starch ether, which comprises reacting starch with a vicinal epoxy compound in the presence of a water-soluble alkaline catalyst, the improvement which comprises reacting an aqueous, alkaline, suspension of granular starch under non-gelatinizing conditions with the vicinal epoxy compound in the presence of a small but effective concentration of up to 5% by weight of a water-soluble compound selected from the group consisting of an ethylenediaminepolyacetic acid and its salts, and then neutralizing the suspension.
3. The process of claim 2 wherein the epoxy compound is ethylene oxide.
4. In the process of preparing granular hydroxyalkyl starch ether, which comprises reacting starch with a vicinal epoxy compound in the presence of a water-soluble alkaline catalyst, the improvement which comprises reacting an aqueous, alkaline suspension of granular starch under non-gelatinizing conditions with the vicinal epoxy compound in the presence of a small but effective concentration of up to 5% by weight of a water-soluble salt of ethylenediaminetetraacetic acid, and then neutralizing the suspension.
5. The process of claim 4 wherein the epoxy compound is ethylene oxide.
6. In the process of preparing granular hydroxyalkyl starch ether, which comprises reacting starch with a vicinal epoxy compound in the presence of a water-soluble alkaline catalyst, the improvement which comprises reacting an aqueous, alkaline suspension of granular starch under non-gelatinizing conditions with the vicinal epoxy compound in the presence of a small but effective concentration of up to 5% by weight of a water-soluble salt of ethylenediaminetetraacetic acid and then neutralizing the suspension to a pH of from about 5 to 7.

References Cited by the Examiner
UNITED STATES PATENTS

| 2,497,838 | 2/50 | Newton et al. | 195—99 |
| 2,516,633 | 7/50 | Kesler et al. | 260—233.3 |
| 2,845,417 | 7/58 | Kesler et al. | 260—233.3 |

WILLIAM H. SHORT, *Primary Examiner.*

A. H. WINKELSTEIN, LEON J. BERCOVITZ,
*Examiners.*